April 24, 1962

J. C. TORBETT 3,031,040

TELEPHONE BOOTH

Filed Jan. 2, 1958

3 Sheets-Sheet 1

INVENTOR.
JOHN C. TORBETT
BY Ralph W. Kalish
ATTORNEY

April 24, 1962

J. C. TORBETT 3,031,040

TELEPHONE BOOTH

Filed Jan. 2, 1958

3 Sheets-Sheet 2

INVENTOR.

JOHN C. TORBETT

BY Ralph W. Kalish

ATTORNEY

INVENTOR.
JOHN C. TORBETT
BY Ralph W. Kalish
ATTORNEY

United States Patent Office 3,031,040
Patented Apr. 24, 1962

3,031,040
TELEPHONE BOOTH

John C. Torbett, Wright City, Mo., assignor to M/T Mfg. & Supply Co., Inc., Warren County, Mo., a corporation of Missouri Filed Jan. 2, 1958, Ser. No. 706,689
1 Claim. (Cl. 189—1)

This invention relates in general to enclosure construction and, more particularly, to certain new and useful improvements in telephone booth structures.

It is an object of the present invention to provide a unique construction, primarily for telephone booths for out of doors placement, but readily adaptable for other types of related enclosures; which comprises a marked simplicity of constituent elements designed for rapid, economic, high-volume production and facile assembly.

It is a further object of the present invention to provide an enclosure which may be fabricated from durable wear-resistant, yet relatively low-cost material; which contains novel means for integration of the parts into a sturdy structure capable of withstanding customary rugged exterior usage; and which contains novel means for quick installation and protective retention of windows.

Other objects and details of the invention will be apparent from the following description, when read in connection with the accompanying drawings (3 sheets) wherein.

Figures 1, 2, 3, 4, 5:
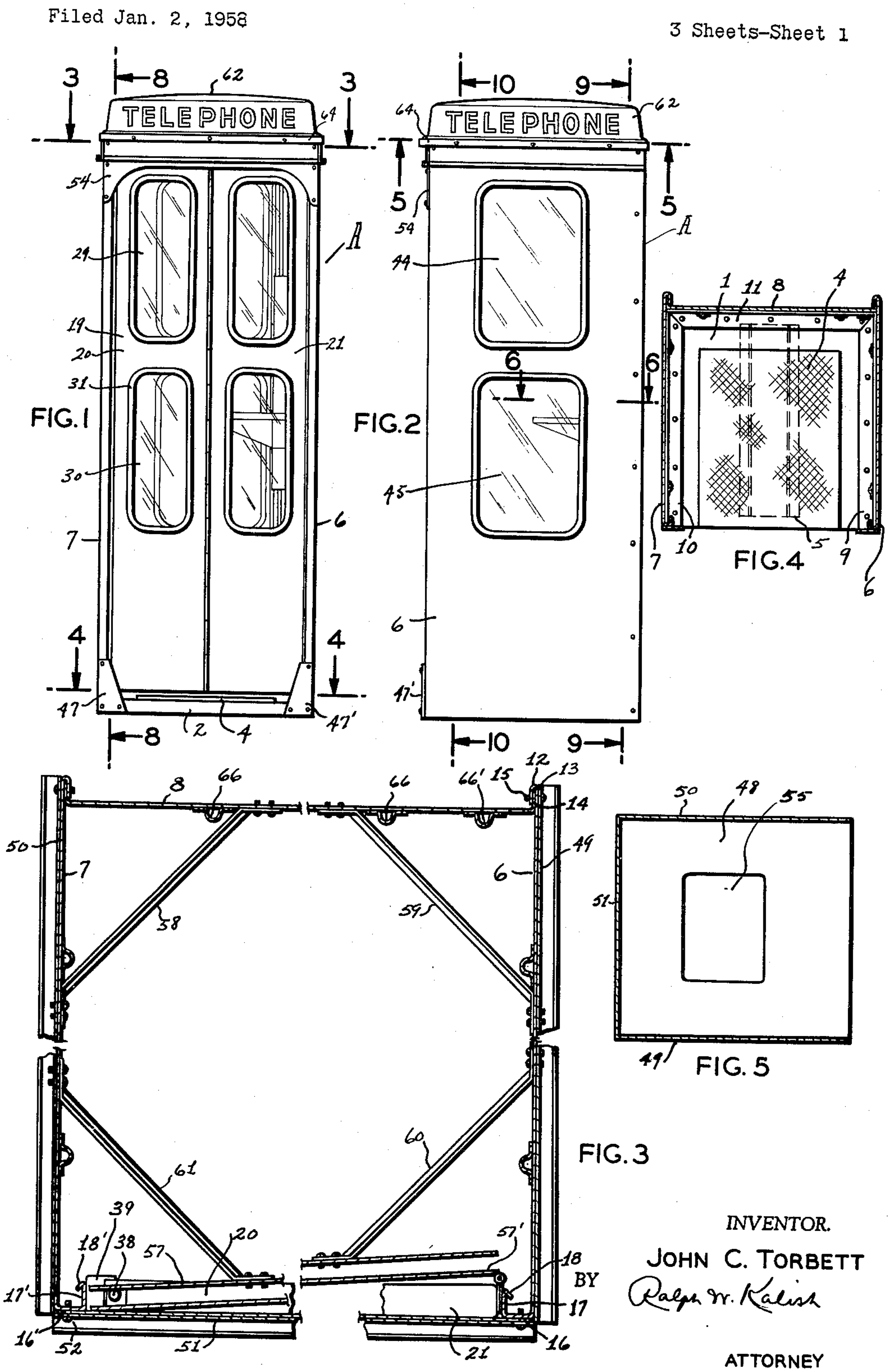
FIGURE 1 is a front view of the telephone booth constructed in accordance with and embodying the present invention, showing the same in closed condition.
FIGURE 2 is a side elevation.
FIGURE 3 is a horizontal transverse section taken on the line 3—3 of FIGURE 1.
FIGURE 4 is a horizontal transverse section taken on the line 4—4 of FIGURE 1.
FIGURE 5 is a horizontal transverse section taken on the line 5—5 of FIGURE 2.

Referring now by reference characters to the drawings which illustrate the preferred embodiment of the present invention, A generally designates a telephone booth formed substantially of sheet material, such as, for example, 18 gauge, cold rolled steel, and being preferably of square cross-section. 1 indicates a floor having a peripheral depending flange 2 which is turned inwardly at its lower end, as at 3 rigidifying floor 1 which is thus presented spacedly above the support surface. Secured directly on the upper face of floor 1, as by welding, is a tread plate 4 having a customary raised pattern, and affixed to the under surface of floor 1, in the central portion thereof, is a supporting hat section 5.

In upstanding relationship to, and on opposite sides of, floor 1, are parallel side wall panels 6, 7, while disposed upstandingly at the normally rearward side of floor 1 is a rear wall panel 8 planarwise perpendicular to side panels 6, 7; said panels 6, 7 and 8 abutting at their lower ends against the confronting portion of depending flange 2 of floor 1 and each being connected to floor 1 through means of angle strips 9, 10, 11, respectively, secured in position, as by screws (FIGURE 4), whereby said wall panels are intimately tied to floor 1 conducing to the marked sturdiness of booth A. At their rearward vertical edges each side panel 6, 7 is folded upon itself as at 12 to provide a groove 13 within which is snugly received the proximate rearwardly turned side flange 14 of rear panel 8, with vertically spaced screws 15 maintaining side panels 6, 7 and rear panel 8 in such interengagement (FIGURE 3). The forwardly presented vertical edge portions of side panels 6, 7 are bent perpendicularly toward each other, to define facing flanges 16, 16′, respectively, which latter are thence turned rearwardly at a right angle to form door jamb sections 17, 17′, respectively, and at their end edges are bracingly, acutely angled, as at 18, 18′ (FIGURE 3).

Presented between jambs 17, 17′ is a door, generally indicated 19 of two-part construction, having companion panels 20, 21, in side by side relation, hingedly secured together on their adjacent side margins for opening and closing movement in the well-known jack knife manner. The other or free side edges as well as the top and bottom edges of each panel 20, 21 are formed in a series of right angle bends to provide generally box-type marginal strengtheners as at 22, with one flange portion 22′ thereof parallel to jambs 17, 17′. On their proximate side edges each panel 20, 21 is provided with mutually diverging flanges 23, 23′, respectively, for securement thereon, as by welding, of a leaf 24, 24′, respectively, of a hinge 25. Angle shaped door stops 26, 26′ are fixed to flanges 23, 23′ and leafs 24, 24′ within the normally intervening space so as to prevent undesired relative movement of panels 20, 21 (see FIGURE 12).

Door 19 is hung on jamb 17 by means of a double-leaf hinge 27, the leafs 28, 28′ of which are welded to jamb 17 and the adjacent flange portion 22′ of panel 20. Each panel 20, 21 has suitably cut or otherwise stamped therein openings for receiving a pair of vertically spaced, elongated, preferably glass, windows, 29, 30, the corners of which are rounded and are maintained within their respective openings by means of continuous gaskets 31 of the general windshield type, having oppositely opening grooves 32, 33 for respectively receiving the edge of the related opening as shown at 34 (FIGURE 11), and the edge of the associated window, whereby the latter are reliably maintained in position, resistant to accidental dislodgment and being so resiliently mounted as to prevent fracturing through jarring and like concussive forces encountered during usage of door 19. Each panel 20, 21 of door 19 is further reinforced by upper, middle, and lower hat sections 35, 36, and 37, respectively, welded on the inner faces thereof. For purposes presently appearing, a cam pin 38 is mounted on door panel 21 for projection upwardly above the upper end thereof adjacent its free side edge. Secured upon the free side edge of door panel 21 is a flexible sealing member of so-called "door nose" 39, extending preferably from top to bottom of said panel for compressive engagement with jamb 17′ when door 19 is closed for insulation against sound and weather. Suitably secured, as by a bracket 40, upon hat section 36 of door panel 20 is one end of a coil spring 41, the opposite end of which is similarly secured as by a bracket 42 upon a mounting plate 43 welded on the inner face of side panel 6; said spring 41 biasing door 19 into closed position. Presented on the inner side of panel 21 at a convenient height is a door handle *h*.

Each side panel 6, 7 and rear wall panel 8 is similarly provided with a pair of vertically arranged window openings for receiving windows 44, 45 which are each retained in position by a gasket 46 similar in construction to gasket 31 above described but of increased dimension for accommodating the larger windows 44, 45. At the lower end of the forward side edge of each side panel 6, 7, the facing flange and jamb portions thereof are cut away to allow interfit with floor 1, with the joint therebetween being obscuringly reinforced by front braces 47, 47', respectively, which latter are secured, by screws, to the related side panel and flange 2 of floor 1 (FIGURE 1).

Figures 10, 11, 12:
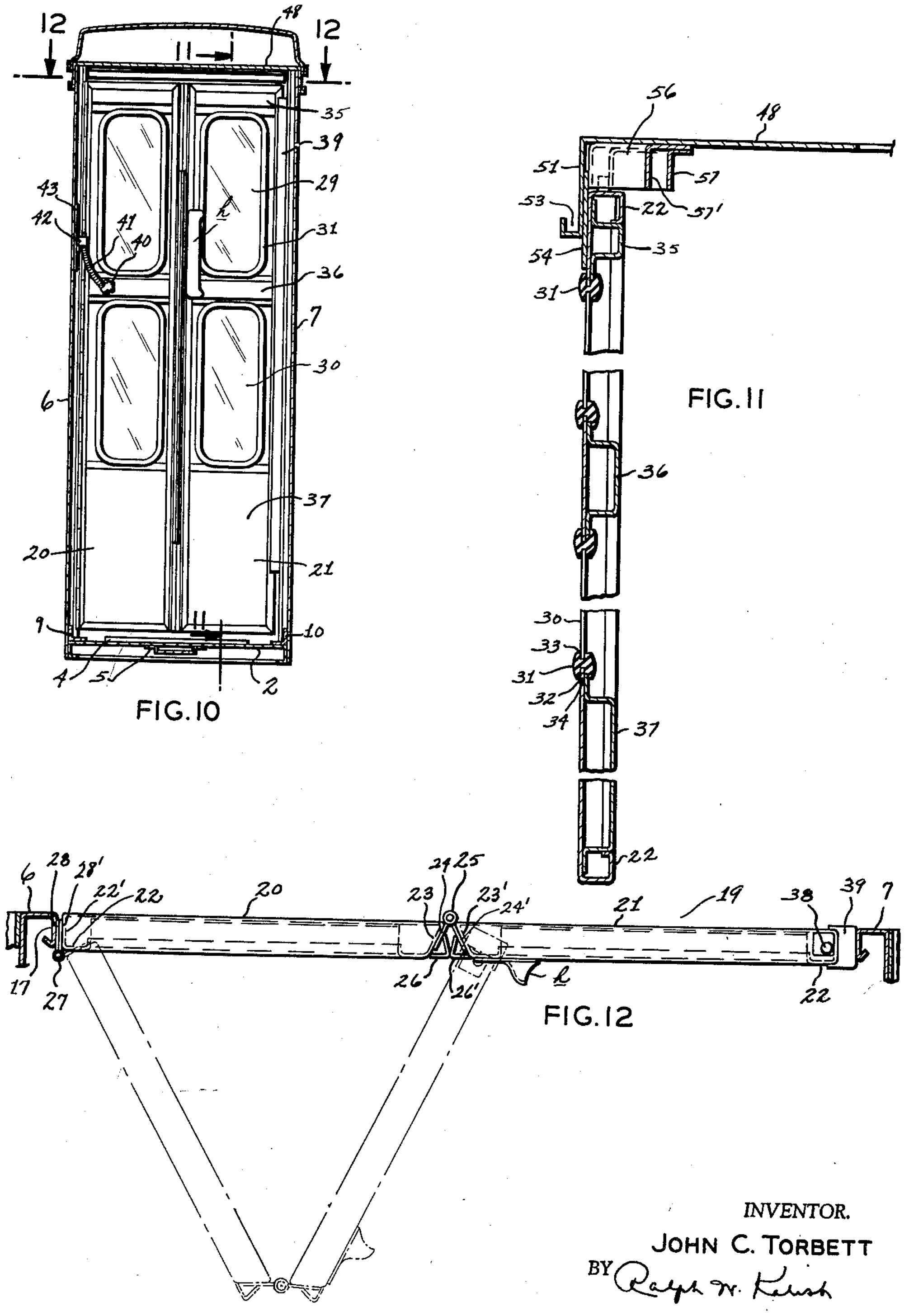
FIGURE 10 is a vertical transverse section taken on the line 10—10 of FIGURE 2.
FIGURE 11 is a vertical transverse section taken on the line 11—11 of FIGURE 10.
FIGURE 12 is a horizontal transverse section taken on the line 12—12 of FIGURE 10 showing in dotted lines the door in opening position.

As will best be seen in FIGURE 10, the upper edge of door 19 terminates spacedly downwardly a short distance from the upper end edges of panels 6, 7, 8 across which there is coveringly disposed a flat, sheet roof member 48, having depending side flanges 49, 50 and a front flange 51, for respective disposition immediately outwardly of side panels 6, 7 and the plane of door 19 when closed; said flanges 49, 50 being secured as by screws to panels 6, 7 while front flange 51 is secured similarly by screws to the upper end portions of facing flanges 16, 16' of side panels 6, 7 as indicated at 52. At their lower ends each flange 49, 50, 51 is turned perpendicularly outwardly and thence upwardly to define a drain trough 53. Flanges 49, 50 and 51 are of such downward extent that front flange 51 projects at its lower edge beneath the upper end of door 19 so as to close the spacing between the upper edge of door 19 and roof 48 (FIGURE 11). There is mounted on the facing flanges 16, 16' the end portions of a lintel-simulative member 54, extending transversely therebetween, and intervening between the inner face of front flange 51 and door 19, abutting against the latter, for snug closure when the same is closed.

Roof 48 is centrally provided with an enlarged opening 55 (FIGURE 5) for a purpose presently to be disclosed. Welded to the under surface of roof 48 adjacent front flange 51 and axially extending in an acute angle-forming relation to said flange 51 is a door guide 56 comprising a pair of spaced apart, parallel flanges 57, 57' defining a path for restraining movement therethrough of cam pin 38 during opening and closing of door 19 (FIGURE 3).

Enhancing the rigidity of booth A are corner braces 58 and 59, each being connected at one of their ends, as by screws, to rear wall 8 adjacent its upper end, and at their other ends respectively to side walls 6, 7 while similar corner braces 60, 61 are respectively connected at their ends to side walls 6, 7 and the inner flanges 57 of door guide 56, all as may best be seen in FIGURE 3; said braces 58, 59, 60 and 61 being located immediately beneath roof 48.

Mounted upon roof 48 is a dome member 62 which may be fabricated of any suitable material, but is preferably translucent and hence desirably of plastic, glass, or the like; said dome having a lower peripheral skirt 63 through which extend screws for fastening the same together with an outer trim member 64 to the upper portions of side panels 6, 7 and rear panel 8.

Dome 62 cooperates with roof 48 to define a chamber 65 within which may be presented a light fixture (not shown) for illuminating the interior of booth A by light transmission through opening 55, and which may simultaneously provide illumination for any informative or decorative matter inscribed or otherwise presented on dome 62, such as, for example, the word "Telephone" as shown in FIGURES 1 and 2.

Secured, as by welding, to the inner faces of side panels 6, 7 and rear panel 8 are vertical, spaced apart, rib-forming members or so-called deck strips 66 extending throughout the length of said panels. There is also mounted on rear panel 8 a relatively short deck strip 66' serving as a shield for electrical leads (not shown) which may be suitably directed into booth A from any convenient power source for a telephone (not shown) to be installed in said booth.

Figures 6, 7:
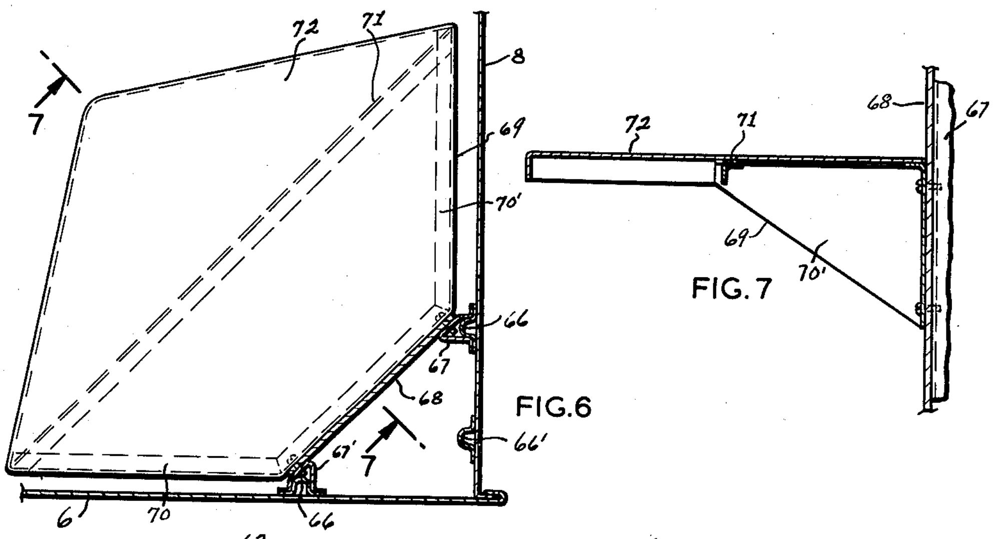
FIGURE 6 is a horizontal transverse section taken on the line 6—6 of FIGURE 2.
FIGURE 7 is a vertical transverse section taken on the line 7—7 of FIGURE 6.
Figure 8:
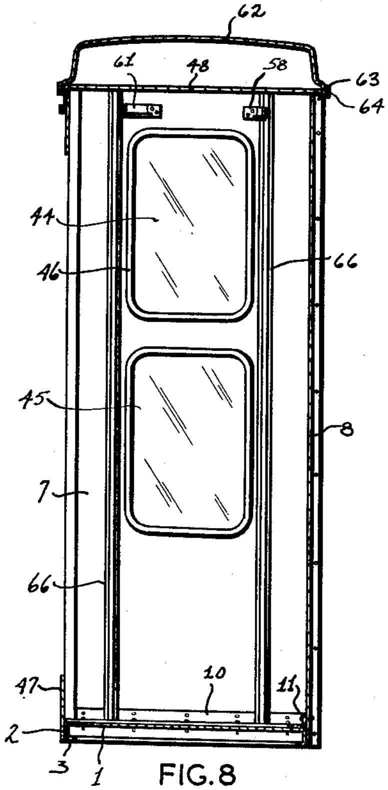
FIGURE 8 is a vertical transverse section taken on the line 8—8 of FIGURE 1.
Figure 9:
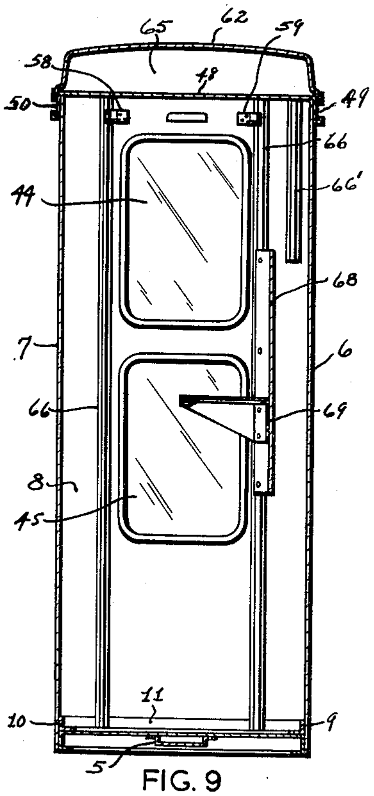
FIGURE 9 is a vertical transverse section taken on the line 9—9 of FIGURE 2.

Referring to FIGURE 6, it will be seen that mounting strips 67, 67' are rigidly fixed on rear panel 8 and side panel 6 adjacent the intervening corner and superimposed on the proximate ribs 66; said mounting strips 67, 67' having angulated face portions for securement thereon of a mounting plate 68 for a telephone (not shown). Secured on mounting plate 68 below the telephone is a bracket 69 having arm portions 70, 70' in substantial parallel relation to rear panel 8 and side panel 6; there being a gusset 71 extending beyond said arms 70, 71' at their outer ends. Fixed as by welding upon bracket 69 and gusset 71, is a, preferably, five-sided table 72 designed to project beyond the telephone (not shown) so as to accord the user a writing surface. It will thus be seen that the telephone and associated table are presented in one of the rearward corners of booth A whereby the user will be provided ample space for maximum comfort.

As shown hereinabove, the booth of the present invention is, except for dome 62, of all-metal construction, and, hence, highly durable and resistant to wear, thereby being uniquely designed for out-of-doors use. The constituent parts of booth A are especially adapted for high volume, economical production, and are so related as to be especially adapted for rapid assembly.

It should be understood that changes and modifications in the formation, construction, arrangement, and combination of the several parts of the telephone booth may be made and substituted for these herein shown and described without departing from the nature and principle of my invention.

I claim:

In a telephone booth construction having a floor, a pair of opposed, parallel side walls, and a rear wall perpendicular to said side walls presented in upstanding relationship to said floor, the improvement comprising a flat sheet roof member in parallel, opposed relationship to the floor and extending over the upper ends of said side walls and rear wall, said roof member further having depending side flanges presented outwardly and overlyingly of the upper end portions of the proximate side wall and being secured thereto, a dome-forming member presented surmountingly upon said roof member and being formed of trunslucent material, said dome-forming member integrally comprising a top portion, side portions extending downwardly from said top portion, and a peripheral skirt depending from the lower portions of said side portions for presentation in overlying, outward relationship upon the depending side flanges of said roof member and the confronting portion of the rear wall, said roof member further having an opening for providing access to the interior of the dome, and illuminating means presented within the dome-forming member and upwardly of the roof member for illuminating the dome through the top portion and side portions thereof as well as the interior of the telephone booth through the roof member opening, said side portions of said dome-forming member being located upwardly of said roof-forming member.

References Cited in the file of this patent

UNITED STATES PATENTS

| | | |
|---|---|---|
| 1,405,984 | Eiler | Feb. 7, 1922 |
| 1,442,942 | Gullicksen | Jan. 23, 1923 |
| 1,503,364 | Howat | July 29, 1924 |
| 1,908,661 | Foltz | May 9, 1933 |
| 2,103,280 | Sherron | Dec. 28, 1937 |
| 2,253,038 | Lee | Aug. 19, 1941 |
| 2,349,144 | Corso | May 16, 1944 |
| 2,749,429 | Wavell | June 5, 1956 |
| 2,860,701 | Wood et al. | Nov. 18, 1958 |
| 2,881,306 | Sherron | Apr. 7, 1959 |